United States Patent
Heady

(10) Patent No.: US 9,205,480 B2
(45) Date of Patent: Dec. 8, 2015

(54) SYSTEM, METHOD AND APPARATUS FOR A PILING RING RELATED TO A PILING RING FOR END BEARING PIER

(71) Applicant: Timothy P. Heady, Elkhart, IA (US)

(72) Inventor: Timothy P. Heady, Elkhart, IA (US)

( * ) Notice: Subject to any disclaimer, the term of this patent is extended or adjusted under 35 U.S.C. 154(b) by 238 days.

(21) Appl. No.: 14/103,377

(22) Filed: Dec. 11, 2013

(65) Prior Publication Data

US 2014/0259619 A1 Sep. 18, 2014

Related U.S. Application Data

(63) Continuation-in-part of application No. 13/826,669, filed on Mar. 14, 2013.

(51) Int. Cl.
*B21D 39/04* (2006.01)
*B23P 11/00* (2006.01)

(52) U.S. Cl.
CPC ............... *B21D 39/046* (2013.01); *B23P 11/00* (2013.01); *Y10T 29/4994* (2015.01)

(58) Field of Classification Search
CPC ...................... Y10T 29/4994; Y10T 29/49911; Y10T 29/4992; Y10T 29/4998; E02D 5/72; E02D 5/22; E02D 5/28; E02D 5/285; B21D 39/046; B23P 11/00; B23P 11/005
See application file for complete search history.

(56) References Cited

U.S. PATENT DOCUMENTS

| | | | | |
|---|---|---|---|---|
| 1,995,419 | A | * | 3/1935 | Derrom .................. B22D 13/02 D13/2 |
| 3,326,006 | A | * | 6/1967 | Mount ..................... E02D 5/52 285/381.1 |

* cited by examiner

*Primary Examiner* — David Bryant
*Assistant Examiner* — Amanda Meneghini
(74) *Attorney, Agent, or Firm* — McKee, Voorhees & Sease, PLC

(57) ABSTRACT

The system, method and apparatus for installing a piling generally includes a hollow piling having an inner surface and an outer surface with the piling having a lower end with a friction collar secured about the lower end. The friction collar is manufactured to have an inner surface wherein the inner surface includes portions with various diameters. The friction collar is placed over the lower end of the piling such that the lower end of the piling is aligned with an intermediate portion of the inner surface of the friction collar. A tapered die is pressed into the bottom of the piling to expand the lower end of the piling outwardly such that it extends into the intermediate portion of the friction collar. This secures the friction collar to the end of the piling. Optionally, an end cap may be placed over the piling and/or friction collar.

3 Claims, 7 Drawing Sheets

SYSTEM, METHOD AND APPARATUS FOR A PILING RING RELATED TO A PILING RING FOR END BEARING PIER

CROSS REFERENCE TO RELATED APPLICATIONS

This application is a Continuation-in-Part of U.S. patent application Ser. No. 13/826,669 filed Mar. 14, 2013, herein incorporated by reference in its entirety.

BACKGROUND OF THE INVENTION

This invention relates generally to installation of a piling which gets driven into the ground to typically support a building. More specifically, though not exclusively, the invention relates to a system, method and apparatus in which a piling ring is manufactured such that it can be installed in a secure fashion without the need for welding.

Generally, pilings may be used to support buildings in a variety of settings. Typically, when the building's footing has eroded or destabilized, pilings can be driven into the ground to ensure that the building rests firmly on bedrock or a more solid foundation.

Typically, a hydraulic ram is used to drive a series of steel pilings into the ground until bedrock or a load bearing strata has been reached. Typically, the pilings are made of steel piping, which comes in four foot sections that may be secured to one another until the piling reaches the desired length. Once inserted, the hydraulic ram and driving assembly can be removed.

During the ramming process, the lead pipe or piling which is inserted into the ground first, is typically capped. This cap or piling ring, typically known as a friction collar, is attached to the bottom most portion of the bottom most piling in the stack. The friction collar adds an additional effective width to the initial diameter of the piling. The use of this friction collar and its additional width clears away an area around the piling as the piling is driven into the ground. This creates a hole in the ground of a larger diameter than the remaining piling sections. The use of such a collar is known to eliminate most of the side friction of the overall system. Thus, the use of such collars is highly desirable.

Unfortunately, heretofore such friction collars have typically been attached and secured to the bottom end of the bottom piling through welding. Welding the friction collar to the bottom piling requires an extensive amount of labor and can easily fail due to a faulty weld.

Therefore, there is a need for an improved friction collar and system and method for installing the same that overcomes the problems of the prior art.

FEATURES OF THE INVENTION

A general feature of the present invention is the provision of a friction collar, a system and method for installing the same which addresses the issues in the prior art.

A further feature of the present invention is the provision of a system and method for installing the friction collar which does not require welding.

An additional feature of the present invention is the provision of a system and method for installing the friction collar that can be easily installed on site.

Yet another feature of the present invention is the provision of a system and method for installing the friction collar that minimizes labor costs.

Still another feature of the present invention is the provision of a system and method for installing the friction collar that remains securely in place during installation of the piling.

SUMMARY OF THE INVENTION

The present invention generally comprises a system, method and apparatus for installing a piling. The piling generally includes a hollow piling having an inner surface and an outer surface wherein the inner surface has an inner diameter and the outer surface has an outer diameter with the piling having a lower end.

A piling ring or friction collar which has an outer surface with a diameter greater than the outer diameter of the piling is manufactured to have an inner surface wherein the inner surface includes portions with various diameters. For example, the friction collar includes a lower portion of its inner surface wherein its diameter is less than the outer diameter of the piling. This diameter of the lower portion of the inner surface of the friction collar is preferably greater than the inner diameter of the piling. The inner surface of the friction collar also has an intermediate portion with a diameter that is greater than the outer diameter of the piling. The inner surface of the collar also has an upper portion with the upper portion's diameter being greater than the outer diameter of the piling but also less than the greatest diameter of the intermediate portion.

A hollow piling having an inner surface and an outer surface with the inner surface having an inner diameter and the outer surface having an outer diameter includes a lower end. The friction collar is placed over the lower end of the piling such that the lower end of the piling is aligned with the intermediate portion of the inner surface of the friction collar. Essentially, the bottom edge of the lower end of the piling contacts the shelf formed at the beginning of the narrow lower section of the friction collar. Initially, this forms an empty space between the outer surface of the piling and the inner surface of the intermediate portion of the inner surface of the collar.

A cone or similarly shaped hardened object, such as a tapered die, is then jammed into the bottom of the piling with the collar held into place to expand the lower end of the piling outwardly such that it extends into the empty space formed between the outer surface of the piling and the inner surface of the intermediate portion of the inner surface of the friction collar. The cone or similarly shaped object is then withdrawn from the piling leaving the friction collar securely attached to the end of the piling. This process may be performed using a hydraulic press with a form punch for insertion into an end of the piling under pressure, causing the end of the piling to expand into the empty space formed by the intermediate portion of the friction collar. Securing mechanisms, including a tube retaining bracket and a bottom alignment ring, may be further incorporated into the hydraulic press to hold the piling safely in position while securing the friction collar. Optionally, an end cap may then be placed over the piling and/or friction collar to further secure the friction collar, prevent soil from getting into the hollow piling as it is driven into the ground and to improve overall appearance.

DETAILED DESCRIPTION OF THE PREFERRED EMBODIMENTS

The present invention will now be described as it applies to its preferred embodiment. It is not intended that the present invention be limited to the described embodiment. It is intended that the invention cover all modifications and alternatives, which may be included within the spirit and scope of the invention. In a preferred embodiment, all of the items discussed here are made of steel and the invention will thus be described with this preference in mind. Other materials, including other varieties of steel, may be used if desired and suitable for the particular installation.

Figure 1:
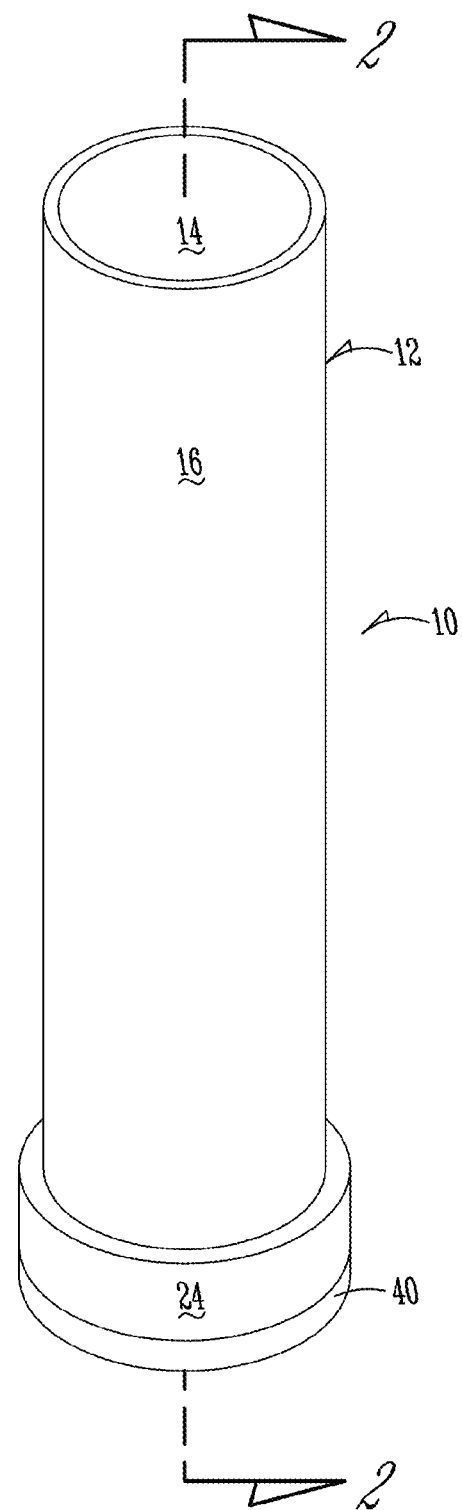
FIG. 1 is a perspective view of the lower piece of piling with the friction collar and end cap installed.

Now, referring to the drawings, FIG. 1 illustrates a preferred embodiment of a piling system 10 constructed according to the present invention. Generally, the piling 12 is secured to the friction collar 24. An end cap 40 may optionally be included if it is desirable to keep soil and other materials away from the interior of the piling 12.

Figure 2:
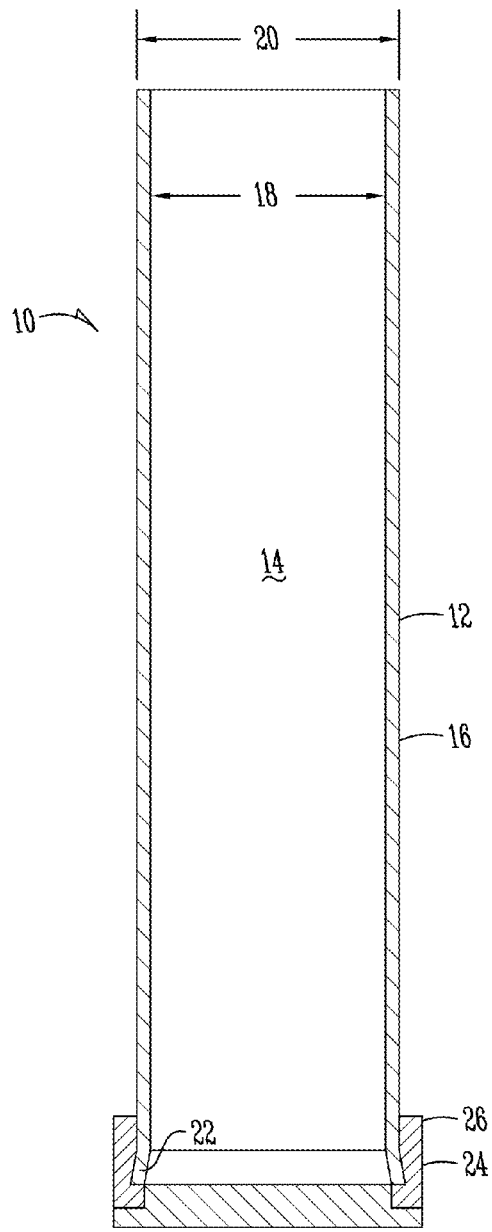
FIG. 2 is a cross-sectional view of FIG. 1 taken along line 2-2.

As shown in FIG. 2, the piling 12 has an inner surface 14 and an outer surface 16. The piling 12 also includes an inner diameter 18 and an outer diameter 20. The piling 12 includes a lower end 22.

Figure 3:
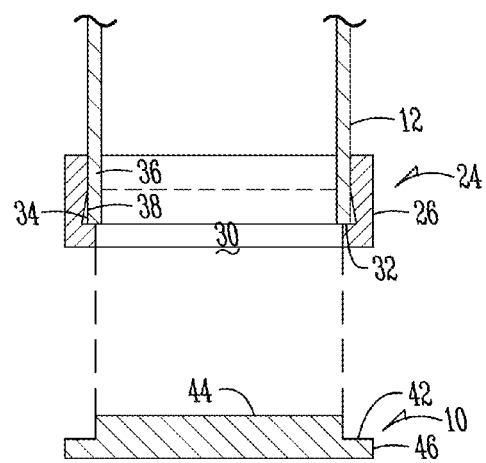
FIG. 3 is a cross-sectional partially exploded view of the friction collar with the piling initially inserted into the friction collar prior to securement and the end cap prior to installation.
Figure 4:
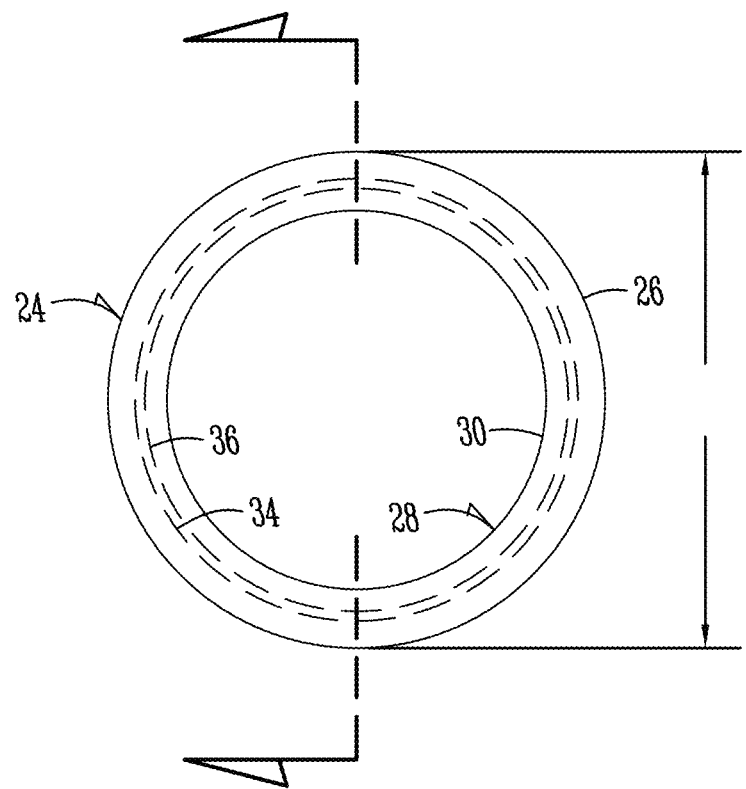
FIG. 4 is a front view of an embodiment of the friction collar.
Figure 5:
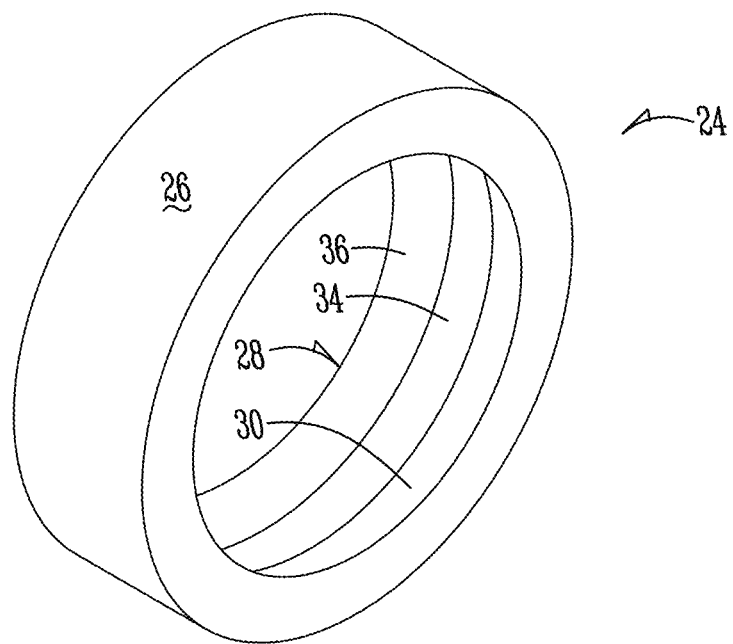
FIG. 5 is a perspective view of an embodiment of the friction collar.

The friction collar 24 is preferably placed over the lower end 22 of the piling 12. As shown in FIG. 3, the friction collar 24 includes an outer surface 26 and an inner surface 28. The inner surface 28 includes a lower portion 30. The friction collar's lower portion 30 has a diameter which is less than the outer diameter 20 of the piling 12. Thus, the lower portion 30 of the friction collar 24 forms a shelf at the bottom to prevent the friction collar 24 from sliding up the piling 12, especially after installation of the collar 24. Preferably, the diameter of the lower portion 30 is also greater than the inner diameter 18 of the piling 12 and more preferably, the diameter of the lower portion 30 is equal to or slightly greater than the inner diameter of the piling 12 after the piling 12 has been angled or flared outwardly as shown in FIG. 2.

The friction collar 24 also includes an intermediate portion 34. The intermediate portion 34 has a diameter which is greater than the diameter of the lower portion 30 and greater than the outer diameter 20 of the piling 12. The diameter of the inner portion 34 may taper to meet with the upper portion 36. The upper portion 36 of the inner surface 28 has a diameter which is greater than the diameter of the piling 12 but less than the diameter of the intermediate portion 34. Thus, the interior profile of the inner surface 28 of the friction collar 24 may include an intermediate portion 34 which appears angled or flared outwardly as shown in FIG. 2.

When initially installed, the shelf formed by the intermediate portion 34 of the inner surface 28 of the friction collar 24 will contact the end of the piling 12. A gap or space 38 will then exist between the piling 12 and the friction collar inner surface 28 at the intermediate portion 34. A cone shaped die or other object (not shown) may be inserted into the lower end of the piling 12 under pressure. This causes the lower end 22 of the piling 12 to expand into the space 38 formed by the intermediate portion 34 of the friction collar 24. In this manner, the friction collar 24 is secured to the piling 12 without the need for welding.

Figure 6:
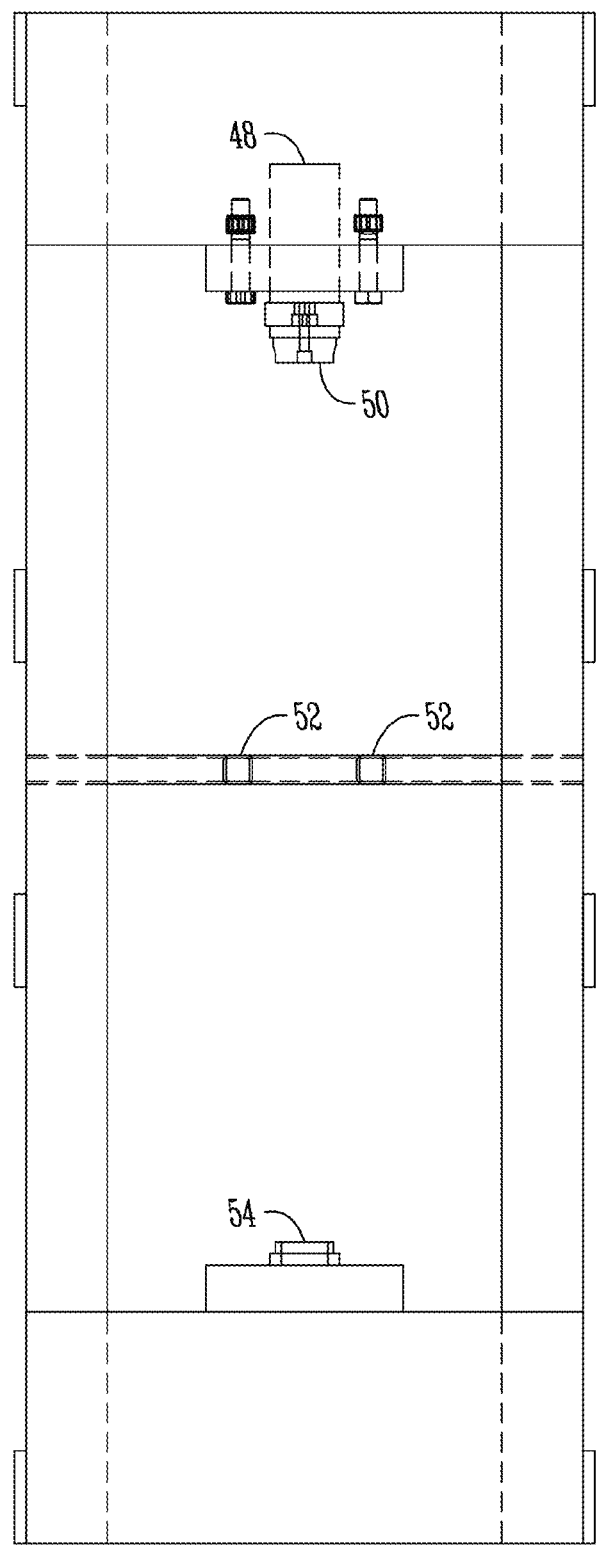
FIG. 6 is a schematic view of a hydraulic press of the present invention.
Figure 7:
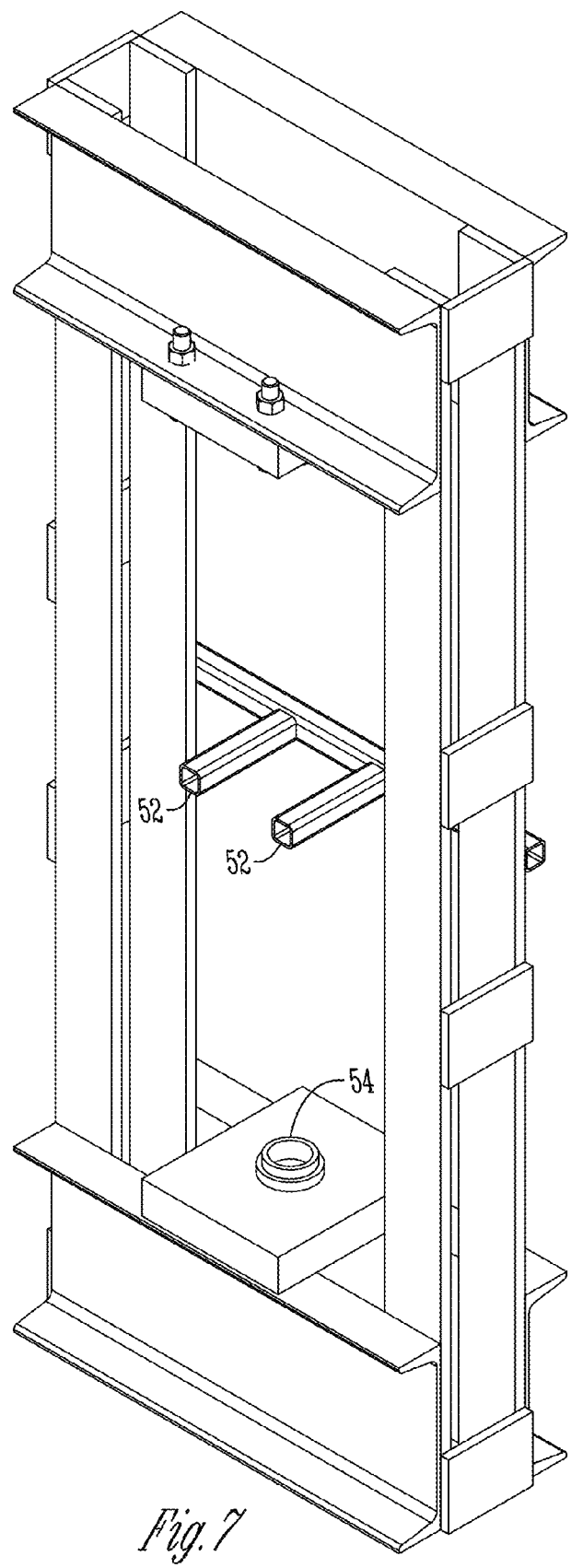
FIG. 7 is a perspective top view of the hydraulic press of FIG. 6.
Figure 8:
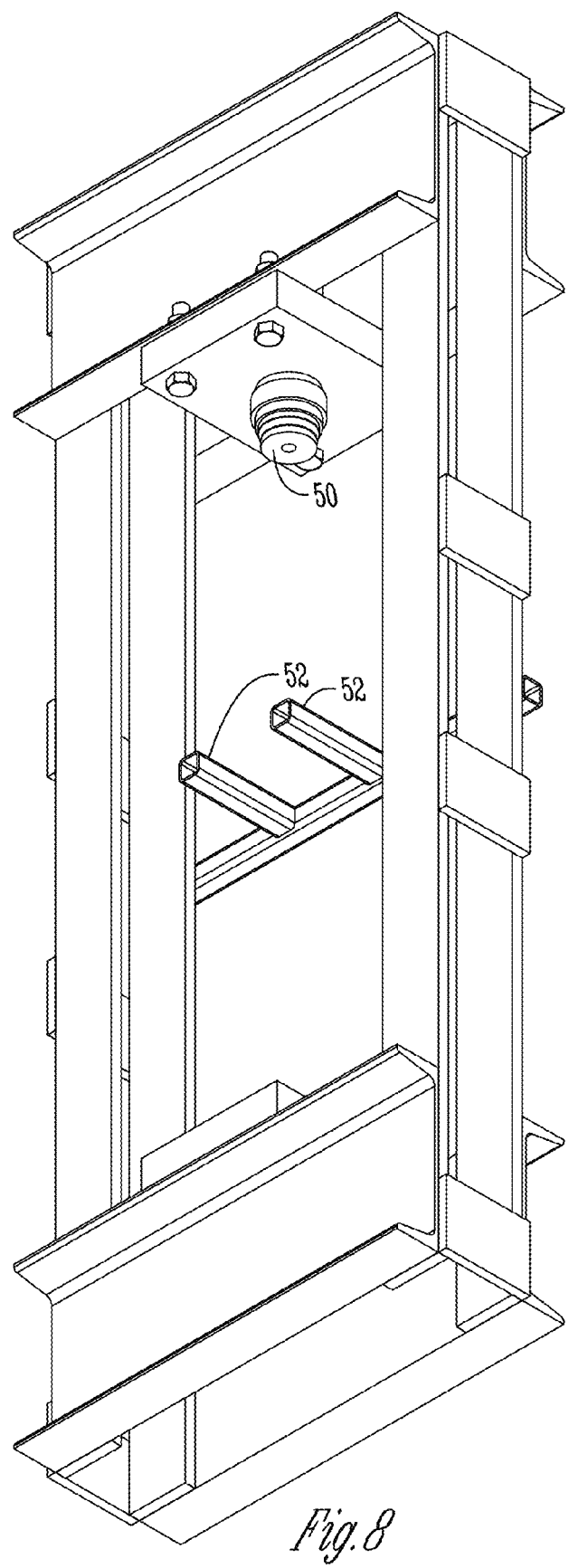
FIG. 8 is a perspective bottom view of the hydraulic press of FIG. 6.

This process may be performed either at the job site or in the shop as desired. For instance, the process may be performed using a hydraulic press 48, preferably a 50 ton hydraulic press, as illustrated in FIGS. 6-8. The hydraulic press 48 includes a form punch 50 for insertion into an end of the piling 12 under pressure. As mentioned previously, this will cause the end 22 of the piling 12 to expand into the space 38 formed by the intermediate portion 34 of the friction collar 24. In this manner, the friction collar 24 is secured to the piling 12 without the need for welding. Currently, there are no securing mechanisms in the industry for holding the piling 12 safely in place while securing the friction collar 24. Such a securing mechanism would prevent injuries from the piling 12 inadvertently popping out and striking a bystander while the friction collar 24 is secured. To overcome these problems, the process of the present invention incorporates into the hydraulic press 48 a tube retaining bracket 52 and a bottom alignment ring 54. The tube retaining bracket 52 has at least two arms extending from the hydraulic press 48 to maintain the piling 12 in an upright position while the friction collar 24 is secured to the piling 12. The bottom alignment ring 54 ensures that piling 12 is in correct alignment with the form punch 50 for affixing the friction collar 24. For instance, the bottom alignment ring 54 has a diameter slightly smaller than the inner diameter 18 of piling 12. Thus, when the piling 12 is placed in the hydraulic press 48, the bottom alignment ring 54 fits slightly inside an end of piling 12—opposite the end being affixed with the friction collar—to hold the piling 12 in the proper position.

Optionally, an end cap 40 may be secured to the lower end of the piling 12, as illustrated in FIGS. 2 and 3. The end cap 40 may include a variety of configurations. Preferably, the end cap 40 includes an end cap lip 42 which is formed by an end cap upper portion 44 that has a smaller diameter than the end cap lower portion 46. Preferably, the end cup upper portion 44 extends into the friction collar 24 to further secure the flared lower end 22 of the piling 12. The end cap 40 may be friction fit, threaded, or otherwise secured to the friction collar 24.

A general description of the present invention as well as a preferred embodiment to the present invention has been set forth above. Those skilled in the art to which the present invention pertains will recognize and be able to practice additional variations in the methods, systems and apparatuses described herein which fall within the teachings of this invention. Accordingly, all such modifications and additions are deemed to be within the scope of the present invention which is to be limited only by the claims appended hereto.

What is claimed is:

1. A method of preparing a piling system for installation, the method comprising:
    providing a hollow piling having an inner surface and an outer surface, wherein the inner surface has an inner diameter and the outer surface has an outer diameter, the piling having a lower end;
    providing a friction collar, the friction collar having an outer surface with a diameter greater than the outer diameter of the piling, the friction collar having an inner surface, the inner surface of the friction collar having a lower portion with a diameter less than the outer diameter of the piling and greater than the inner diameter of the piling, the inner surface of the friction collar further having an intermediate portion with the diameter greater than the outer diameter of the piling, and the inner surface of the collar having an upper portion with a diameter greater than the outer diameter of the piling and less than the diameter of the intermediate portion;

providing a hydraulic press, the hydraulic press comprising a form punch, a tube retaining bracket, and a bottom alignment ring;

inserting the lower end of the piling into the collar such that the lower end of the piling is aligned with the intermediate portion of the inner surface of the friction collar, an empty space being formed between the outer surface of the piling and the inner surface of the intermediate portion of the inner surface of the friction collar;

inserting the piling into the hydraulic press;

moving the piling into position using the tube retaining bracket and the bottom alignment ring; and flaring the lower end of the piling outwardly using the form punch such that it extends into the empty space of the intermediate portion.

2. The method of claim 1 wherein the flaring step comprises inserting a tapered die into the inner surface of the hollow piling through the lower portion of the collar and pressing the die against the inner surface of the piling until the lower end of the piling is flared outwardly into the empty space; and withdrawing the tapered die from the inner surface of the hollow piling.

3. The method of claim 1 further comprising securing an end cap to the friction collar below the piling.

* * * * *